US007197546B1

(12) United States Patent
Bagga et al.

(10) Patent No.: US 7,197,546 B1
(45) Date of Patent: Mar. 27, 2007

(54) INTER-DOMAIN NETWORK MANAGEMENT SYSTEM FOR MULTI-LAYER NETWORKS

(75) Inventors: Yudhveer S. Bagga, Gahanna, OH (US); Arati Chaudhury, Tinton Falls, NJ (US); Charleen E. Hird, Rumson, NJ (US); Ted Chongpi Lee, Holmdel, NJ (US); William W. Pretyka, Metuchen, NJ (US); Danilo L. Puseljic, Metuchen, NJ (US); Susan Rose Russo, Red Bank, NJ (US); Reza Shafie-Khorasani, Westerville, OH (US); Thomas Peter Tignor, Mendham, NJ (US); Rulei Ting, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/520,133

(22) Filed: Mar. 7, 2000

(51) Int. Cl.
*G06F 15/16* (2006.01)

(52) U.S. Cl. .................... 709/223; 203/217; 203/219; 203/225; 203/226; 203/229; 370/469; 707/101

(58) Field of Classification Search ............... 709/223, 709/203, 217, 225, 226, 229, 219; 707/101; 370/469
See application file for complete search history.

(56) References Cited

U.S. PATENT DOCUMENTS

| | | | | |
|---|---|---|---|---|
| 5,491,693 A * | 2/1996 | Britton et al. | ............... | 370/401 |
| 5,726,979 A * | 3/1998 | Henderson et al. | ......... | 370/254 |
| 5,768,501 A * | 6/1998 | Lewis | ........................ | 714/48 |
| 6,222,533 B1 * | 4/2001 | Notani et al. | ................ | 715/733 |
| 6,259,679 B1 * | 7/2001 | Henderson et al. | ......... | 709/223 |
| 6,260,062 B1 * | 7/2001 | Davis et al. | ................ | 709/223 |
| 6,289,201 B1 * | 9/2001 | Weber et al. | ............... | 455/13.1 |
| 6,289,384 B1 * | 9/2001 | Whipple et al. | ............. | 709/229 |
| 6,330,601 B1 * | 12/2001 | French et al. | ................ | 709/223 |
| 6,400,689 B1 * | 6/2002 | Sato et al. | ................... | 709/223 |
| 6,594,279 B1 * | 7/2003 | Nguyen et al. | ............. | 370/468 |
| 6,654,759 B1 * | 11/2003 | Brunet et al. | ............... | 709/223 |
| 6,940,821 B1 * | 9/2005 | Wei et al. | ................... | 370/244 |
| 2002/0004828 A1 * | 1/2002 | Davis et al. | ................ | 709/223 |

OTHER PUBLICATIONS

ITU-T Recommendation G.805 "Digital Networks: Generic Functional Architecture of Transport Networks." ITU 1996.*

(Continued)

*Primary Examiner*—David Wiley
*Assistant Examiner*—Alina Boutah

(57) ABSTRACT

A network management system for a multi-layer network having multiple architectural or technological domains includes an inter-domain configuration manager arranged between a set of one or more network service management applications and a set of network element domain managers, each of the domain managers being associated with a particular domain of the multi-layer network. The configuration manager implements network service design and provisioning functions across the domains of the network in conjunction with stored connectivity information characterizing the multi-layer network. The network management system further includes an inter-domain fault manager and an inter-domain capacity manager, which provide respective fault management and transport capacity management functions across the domains of the multi-layer network. The inter-domain configuration manager, inter-domain fault manager and inter-domain capacity manager may be interfaced to the set of network service management applications and the set of network element domain managers through corresponding published Common Object Request Broker Architecture (CORBA) Application Programming Interfaces (APIs).

19 Claims, 10 Drawing Sheets

OTHER PUBLICATIONS

Mazumdar, Subrata. "Inter-Domain Management between CORBA and SNMP: WEB-based Management—CORBA/SNMP Gateway Approach." Lucent Technologies, 1996. pp. 1-16.*

Shen, Chien-Chung; and Wei, John Y. "Network-Level Information Models for Integrated ATM/SONET/WDM Management." IEEE, 1998. pp. 176-185.*

Shen, Chien-Chung; and Wei, John Y. "The Network as Distributed Object Database". IEEE, 1998. pp. 540-548.*

Bjerring et al. "Experiences in developing mult-technology TMN systems." IEEE, 1998. pp. 445-454.*

Mortensen, M. Lucent Network & Services Management White Paper. "Opeations Architecture for Data-Centric Converged Telecommunications Networks: Lucent Technologies' Open Operations CORBA Architecture." Lucent Technologies, 1999. pp. 1-10.*

E-mail correspondence between Dr. Mark H Mortensen and Shirelle Green, obtained Aug. 25, 2003.*

ITU-T, "Recommendation G.805—Generic Functional Architecture of Transport Networks," 45 pages, Nov. 1995.

ITU-T, "Recommendation M.3100—Generic Network Information Model," 99 pages, Jul. 1995.

M. Mortensen, "Operations Architecture for Data-Centric Converged Telecommunications Networks: Lucent Technologies Open Operations CORBA Architecture," Lucent Network and Services Management White Paper, pp. 1-10, 1999.

* cited by examiner

INTER-DOMAIN NETWORK MANAGEMENT SYSTEM FOR MULTI-LAYER NETWORKS

PRIORITY CLAIM

The present application claims the priority of U.S. Provisional Application No. 60/146,704 filed Jul. 30, 1999 in the name of inventors Y. S. Bagga et al. and entitled "A Network Management System Solution For Diverse And Converged Voice And Data Networks."

FIELD OF THE INVENTION

The present invention relates generally to telecommunications network management systems, and more particularly to systems for management of multi-layer networks incorporating diverse architectural and technological domains.

BACKGROUND OF THE INVENTION

The rapid evolution of the telecommunications industry has resulted in the convergence of voice and data transport over a number of diverse architectural and technological domains, such as, e.g., Time Division Multiplexing (TDM), Asynchronous Transfer Mode (ATM), Synchronous Optical Network (SONET), Synchronous Digital Hierarchy (SDH), Frame Relay (FR), Dense Wavelength Division Multiplexing (DWDM) and Internet Protocol (IP). The choice of the backbone transport protocols depends on the service mix. For example, public multi-service providers such as AT&T having customer Service Level Agreements (SLAs) may utilize a full stack of technologies, while national Internet Service Providers (ISPs) may choose direct IP over DWDM networks.

Several vendors provide the different technologies. This situation creates network environments where one technology is provided by one vendor and another technology by a different vendor. Technology providers supply element and network management systems to manage their technologies, causing a creation of a "smoke-stack" network management environment for the service providers. The network management situation is further complicated by multi-vendor support even within a single technology, and a service provider therefore generally needs to partition the management of its growing network. For example, a TDM voice network and its Operation Support Systems (OSSs) can be regarded as one domain, while an ATM data network and its related OSSs can be regarded as another domain.

Lack of integration across different technologies has rendered the management and control of such a multi-layer "network of networks" very complex and costly. More specifically, these environments prevent quick introduction of new services, prolong service implementation, complicate service maintenance activities and prolong maintenance intervals, and lack service capacity management capabilities.

Therefore, what is needed is a inter-domain network management architecture that addresses the above-mentioned problems while taking into account the existing service provider investments in technology-specific management systems and their evolution and also preserving the integrity of network management data.

SUMMARY OF THE INVENTION

An advancement in the art of telecommunications is achieved by providing a network management system which in accordance with an aspect of the invention allows telecommunication service providers to perform end-to-end inter-domain service design, provisioning, fault correlation, and capacity management for a multi-layer network. As a result, the invention provides a full view of a service composition hierarchy that facilitates expedited maintenance and testing activities and common access to logical and physical service or network design data. The invention provides these features in part through the creation and maintenance of an information database of all the physical and logical network connectivity required to manage the multi-layer network.

In accordance with the invention, a network management system for a multi-layer network having multiple architectural or technological domains includes an inter-domain configuration manager arranged between a set of one or more network service management applications and a set of network element domain managers, each of the domain managers being associated with a particular domain of the multi-layer network. The domains may include, e.g., a circuit-switched domain, an IP domain, an ATM domain, a Frame Relay domain, an SDH domain, a SONET domain, an optical domain, etc. The inter-domain configuration manager implements network service design and provisioning functions across the domains of the network in conjunction with stored connectivity information characterizing the multi-layer network. The inter-domain configuration manager provides single-point access to provisioning functions, and end-to-end views of services and their underlying infrastructure, down to a physical layer of the multi-layer network, in a manner which is independent of the corresponding domains.

The network management system may further include an inter-domain fault manager and an inter-domain capacity manager, which provide respective fault management and transport capacity management functions across the domains of the multi-layer network.

The inter-domain configuration manager, inter-domain fault manager and inter-domain capacity manager may be interfaced to the set of network service management applications and the set of network element domain managers through corresponding published Common Object Request Broker Architecture (CORBA) Application Programming Interfaces (APIs).

Advantageously, the present invention allows service providers in the telecommunications industry to achieve quick introduction of new services, expedited service implementation, prompt fault resolution, and service capacity management capabilities not available in their current multi-layer network environments.

These and other features and advantages of the present invention will become more apparent from the accompanying drawings and the following detailed description.

DETAILED DESCRIPTION OF THE INVENTION

Figure 1:
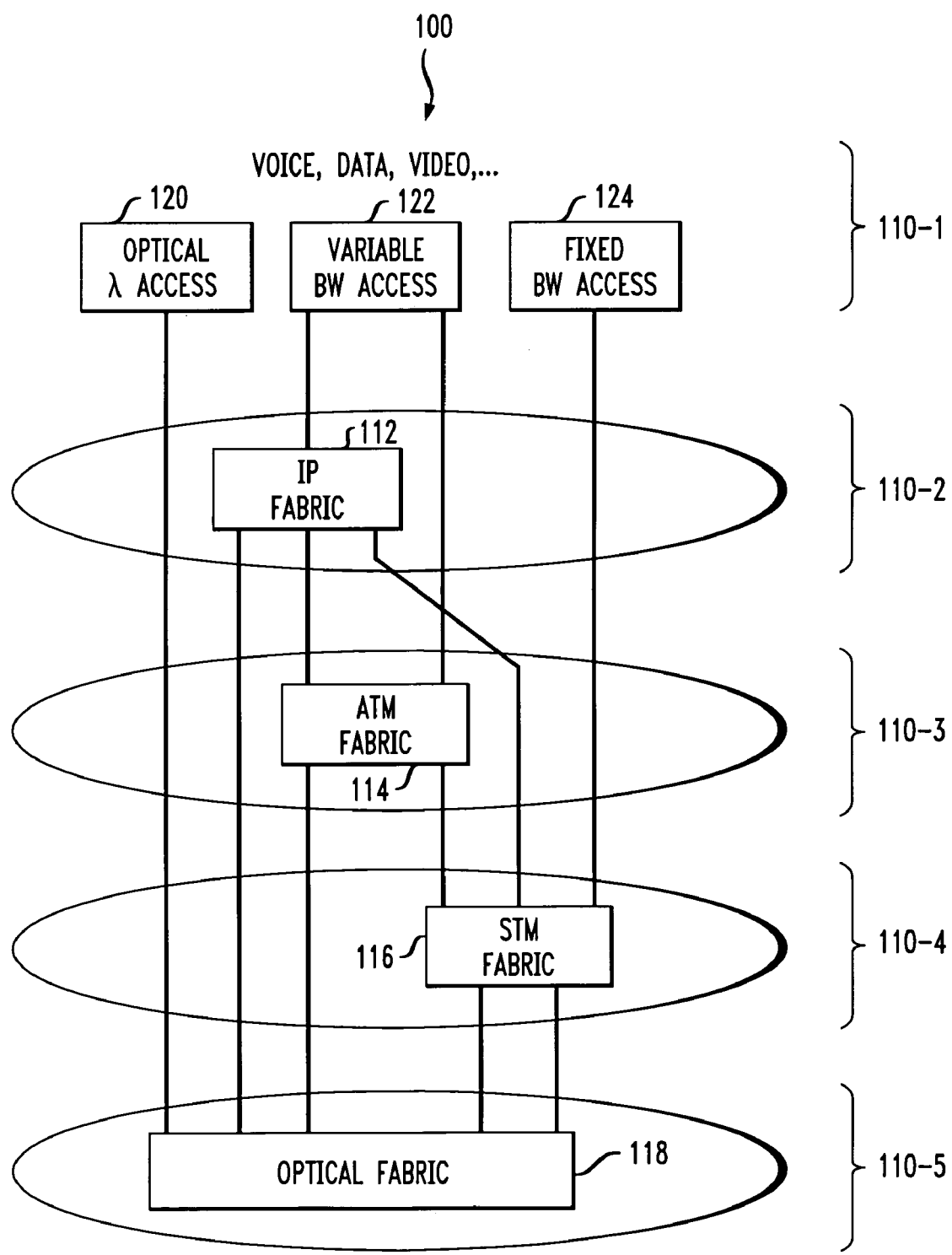
FIG. 1 shows an example of a multi-layer network in which the present invention may be implemented.

FIG. 1 shows an example of a multi-layer telecommunications network 100 in which the present invention may be implemented. The network 100 in this example provides voice, data and video services utilizing a multi-layer architecture which includes five layers 110-$i$, i=1, 2, . . . 5. The layer 110-1 is a service layer associated with the above-noted voice, data and video services. The remaining layers 110-2, 110-3, 110-4 and 110-5 include an IP fabric 112, an ATM fabric 114, a Synchronous Transfer Mode (STM) fabric 116, and an optical fabric 118, respectively. The network 100 provides direct optical wavelength access 120 via the optical fabric 118, variable bandwidth access 122 via the IP fabric 112 and ATM fabric 114, and fixed bandwidth access 124 via the STM fabric 116.

It should be emphasized that the architecture of the network 100 as shown in FIG. 1 is by way of example only. The particular multi-layer network configuration for a given telecommunication service provider will generally depend on factors such as the multitude and type of services the service provider would like to offer. For example, as previously noted, public multi-service providers like AT&T having customer Service Level Agreements (SLAs) will generally utilize a full stack of technologies, while national Internet service providers (ISPs) will choose direct IP over DWDM networks.

Additional details regarding the configuration and operation of multi-layer telecommunication networks such as network 100 may be found in, e.g., ITU-T, "Recommendation G.805—Generic Functional Architecture of Transport Networks," November 1995; ITU-T, "Recommendation M.3100—Generic Network Information Model," July 1995; M. Mortensen, "Operations Architecture for Data-Centric Converged Telecommunications Networks: Lucent Technologies Open Operations CORBA Architecture," Lucent Network and Services Management White Paper, 1999; and M. Mortensen, "Guaranteeing operations quality," Telephony, Jul. 5, 1999, all of which are incorporated by reference herein.

The present invention provides a network management system designed to support the management of any and all of the network technology layers depicted in the FIG. 1 multi-layer network example, as well as any other arrangement of these and other network technology layers that may be found in service provider telecommunications networks, including future transport technologies. The term "domain" as used herein is intended to refer to different types of technologies or architectures supported by a given network. For example, the network 100 of FIG. 1 includes IP, ATM, STM and optical domains. It should be noted that a particular domain need not correspond to a certain network layer, and may encompass multiple network layers. In addition, a given network layer may be associated with multiple domains.

Figure 2:
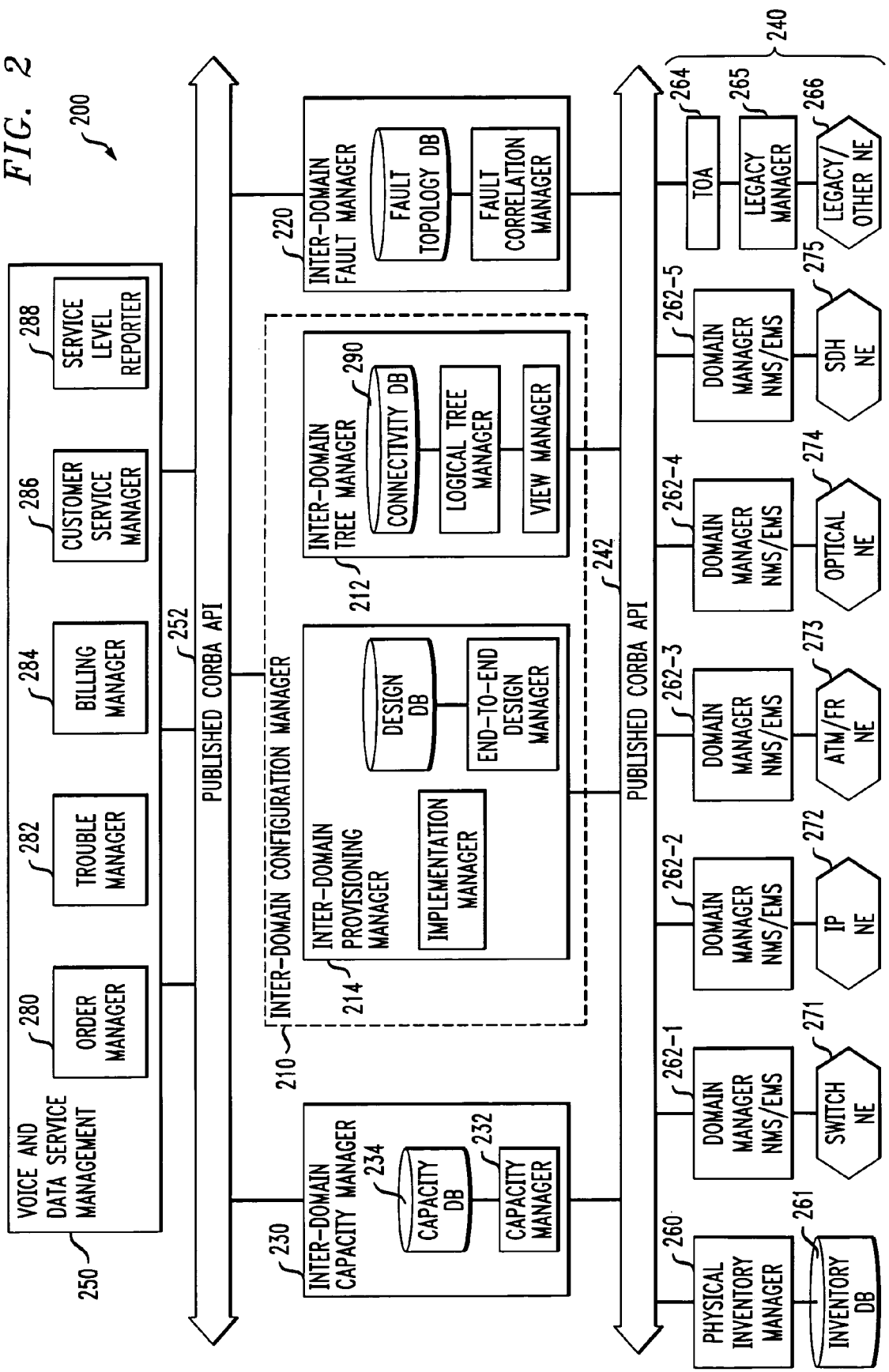
FIG. 2 shows an inter-domain network management system in accordance with an illustrative embodiment of the invention.

FIG. 2 shows an inter-domain network management system 200 in accordance with an illustrative embodiment of the invention. The system 200 may be used to manage the network 100 as shown in FIG. 1, or any other type of multi-layer telecommunications network.

The network management system 200 in this embodiment is shown in the context of a traditional Telecommunication Management Network (TMN) architecture, structured in terms of business, service, network and element management layers. The system 200 includes an Inter-Domain Configuration Manager 210 having as elements thereof an Inter-Domain Tree Manager 212 and an Inter-Domain Provisioning Manager 214, an Inter-Domain Fault Manager 220, and an Inter-Domain Capacity Manager 230.

The applications 210, 220 and 230 and their associated modules interface with a set of domain management systems 240 and a set of service management layer applications 250 via published Common Object Request Broker Architecture (CORBA) Application Programming Interfaces (APIs) 242 and 252, respectively. The CORBA APIs 242 and 252 may be configured in accordance with well-known Internet Inter-ORB Protocol (IIOP) specifications.

The set of domain management systems 240 includes a Physical Inventory Manager 260 associated with an Inventory Database 261, Domain Manager Network Management System/Element Management Systems (NMS/EMSs) 262-1, 262-2, 262-3, 262-4 and 262-5, and a Technology Object Adapter (TOA) 264 which interfaces with a legacy manager 265 and legacy or other types of network elements 266. The domain manager NMS/EMSs 262-1, 262-2, 262-3, 262-4 and 262-5 manage network elements which include a switch network element (NE) 271, an IP NE 272, an ATM/FR NE 273, an optical NE 274 and an SDH NE 275, respectively. The domain management systems 240 are also referred to herein simply as domain managers.

The set of service management layer applications 250 in the network management system 200 includes an Order Manager 280, a Trouble Manager 282, a Billing Manager 284, a Customer Service Manager 286, and a Service Level Reporter 288.

In the illustrative embodiment, all components of the system 200 are required to publish a standard API so as to eliminate pair-wise interfaces. When the standard API cannot be met by a given component, the TOA 264 may be utilized so that the standard API can be met without changing the core applications. This isolates pair-wise interfaces to an adaptation process that translates requests and responses from an external interface protocol into the published API.

An important aspect of the network management system 200 is the connectivity database 290, which in this embodiment is shown as an element of the Inter-Domain Tree Manager 212. The connectivity database 290 stores all of the physical and logical network connectivity data needed to manage the corresponding network. This database may be implemented as, e.g., a large directory with open, standard interfaces.

As will be described in greater detail below, the interaction of the components of the network management system 200 provides support for end-to-end cross-domain service design, flow-through provisioning, full service hierarchy layering view, inter-domain fault correlation and proactive capacity management.

It should be noted that the system components 210, 220 and 230 in the illustrative embodiment of FIG. 2 generally occupy a space between traditional service and network layer management applications in the above-noted TMN architecture. The components 210, 220 and 230 interface to the service management layer applications 250 such as Order Manager 280 and Trouble Manager 282 and to the domain-specific network management systems 240. The particular number, type and configuration of service and network layer applications that the components 210, 220 and 230 will interface with in a given implementation of the invention will generally depend on network-specific factors such as the network components and complexity.

Figure 3:
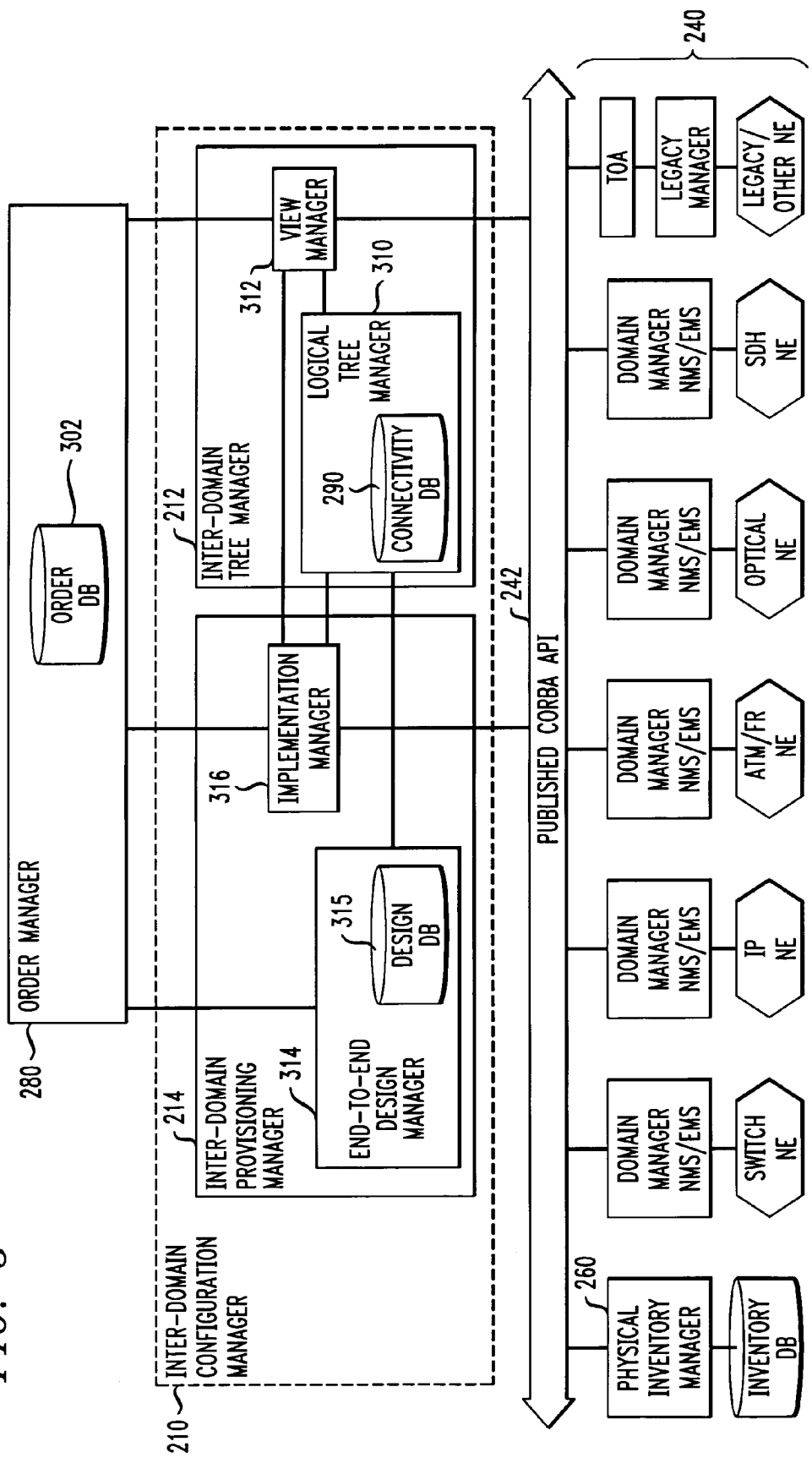
FIG. 3 shows a more detailed view of an inter-domain configuration manager component of the FIG. 2 network management system in accordance with the invention.

FIG. 3 illustrates in greater detail the Inter-Domain Configuration Manager 210 and its interaction with service and network layer applications. More specifically, FIG. 3 shows the interaction of the Inter-Domain Configuration Manager 210 with the Order Manager 280. The Order Manager 280 as shown in FIG. 3 includes an order database 302.

The Inter-Domain Configuration Manager 210 in the illustrative embodiment enables single point access to provisioning tasks and to end-to-end views of services and their underlying infrastructure, down to the physical layer, in a manner which is independent of domain. In this illustrative embodiment, as previously noted in conjunction with FIG. 2, the Inter-Domain Configuration Manager 210 includes Inter-Domain Tree Manager 212 and Inter-Domain Provisioning Manager 214.

The Inter-Domain Tree Manager 212 provides and maintains a detailed end-to-end view of planned and provisioned transport services and facilities. It includes a Logical Tree Manager 310 and a View Manager 312. The Inter-Domain Provisioning Manager 214 includes an End-to-End Design Manager 314 having a design database 315 associated therewith, and an Implementation Manager 316.

The Logical Tree Manager 310 manages end-to-end transport service and facility hierarchy. It maintains parent-child relationships in a tree structure that references the domains that contain the real-time network details. More particularly, the functions of the Logical Tree Manager 310 are as follows:

1. Create and manage the end-to-end service design view and logical hierarchy of facilities supporting the service.
2. Maintain pointers to the components of the domain management systems 240, including the Physical Inventory Manager 260, that contain the details of the relevant section capturing the hierarchical relationship.
3. Store information regarding leased facilities.
4. Maintain circuit status, e.g., pending, implemented, in-effect, etc.
5. Receive data from the End-to-End Design Manager 314 and Implementation Manager 316.
6. Service requests from View Manager 312 for trail hierarchy information
7. Notify the View Manager 312 of trail status changes so that the View Manager 312 can forward the changes to the appropriate "subscribers," e.g., the Inter-Domain Fault Manager 220.

The View Manager 312 provides different presentations of the network connectivity data when requested. It is not a user interface, but instead a mechanism to retrieve data stored by the Logical Tree Manager 310. Presentations may be in the form of maintenance records, down to the physical connectivity, or may include end-to-end service and facility relationships. More particularly, the functions of the View Manager 312 are as follows:

1. Provide the end-to-end view of the full service hierarchy to client applications.
2. Assemble requested information for an end-to-end trail, using information from the connectivity database 290 in the Inter-Domain Tree Manager 212 and queries to related domain management systems 240 including Physical Inventory Manager 260. The request may come from several applications including, but not limited to, the Inter-domain Fault Manager 220, the Implementation Manager 316, the Inter-Domain Capacity Manager 230, and the Customer Service Manager 286.
3. Provide flexible presentation of different levels of the trail hierarchy.
4. Retrieve from the domain management systems 240 detailed views of the service design they manage.
5. Receive trail status changes from the Logical Tree Manager 310, package the information and forward to subscribed applications such as, e.g., the Inter-Domain Fault Manager 220, the Inter-Domain Capacity Manager 230, etc.

An example of a logical tree that may be created from a multi-layer network by the Inter-Domain Configuration Manager 210 in accordance with the techniques of the invention will now be described in conjunction with FIGS. 4 and 5.

Figure 4:
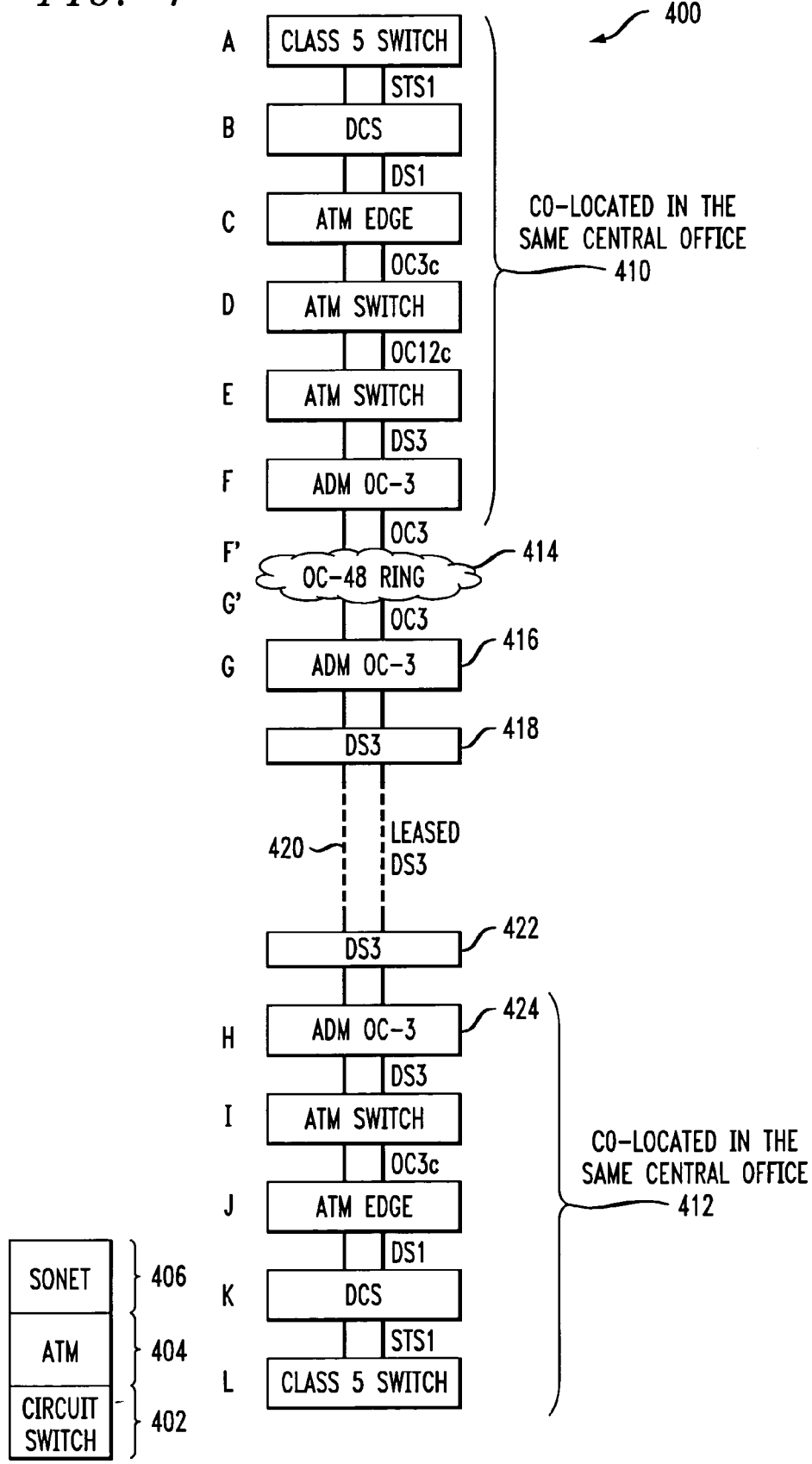
FIG. 4 illustrates the operation of the invention in conjunction with a multi-layer network example.

FIG. 4 illustrates a multi-layer network 400 which includes circuit switch network 402 supported by an ATM network 404 that is in turn carried by a SONET network 406. The network includes a first portion 410 having a number of elements co-located at a first central office, and a second portion 412 having a number of elements co-located at a second central office.

The first portion 410 includes a Class 5 circuit switch element A coupled by an STS1 line to a Digital Cross-connect System (DCS) element B, which is coupled by a DS1 line to an ATM Edge device C, which is coupled by an OC-3c line to an ATM switch D, which is coupled by an OC-12c line to an ATM switch E, which is coupled to an Add-Drop Multiplexer (ADM) OC-3 element F. The ADM OC-3 element F is coupled to an OC-48 ring 414, which is coupled to another ADM OC-3 element 416, which is coupled via DS3 element 418 to a leased DS3 line 420. The leased DS3 line 420 is coupled to another DS3 element 422, also denoted element H. Element H is coupled to the second portion 412, which includes an ADM OC-3 element 424 coupled via a DS3 line to an ATM switch I, which is coupled via an OC-3c line to an ATM Edge device J, which is coupled via a DS1 line to a DCS element K, which is coupled via an STS1 line to a Class 5 circuit switch element L.

It is apparent that a service provider having access to the multi-layer network 400 will be able to offer several kinds of transport services.

Figure 5:
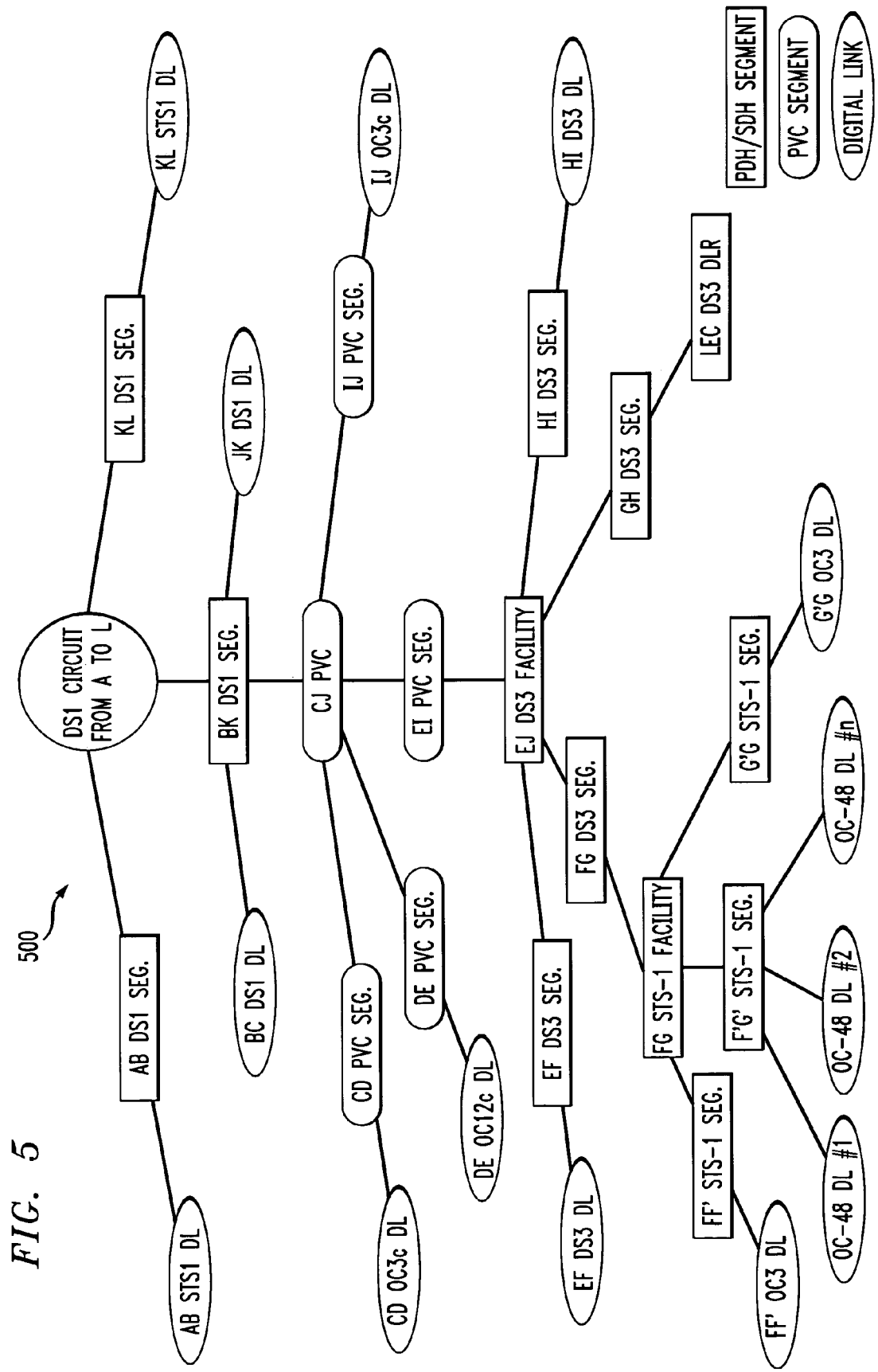
FIG. 5 shows a connectivity database structure for a DS1 circuit in accordance with the invention.

FIG. 5 shows an example of a hierarchical service structure logical tree 500 that may be maintained by the Inter-Domain Tree Manager 212 for a DS1 message trunk from Class 5 switch A to Class 5 switch L provisioned on the multi-layer network 400 as depicted in FIG. 4. The "leaves" of the tree reference the appropriate domain management system 240 that contains the details about the individual trail segment. The leaves in this example include Plesiochronous Digital Hierarchy (PDH)/Synchronous Digital Hierarchy (SDH) segments, Permanent Virtual Circuit (PVC) segments and digital links, with the endpoints of each segment or link denoted in the label of the corresponding leaf.

Referring again to FIG. 3, the Inter-Domain Provisioning Manager 214 supports seamless provisioning of services and facilities across different technologies, vendors or other multiple domains. In this embodiment, as previously noted, the Inter-Domain Provisioning Manager 214 includes the End-to-End Design Manager 314, which has a design database 315 associated therewith, and the Implementation Manager 316.

The End-to-End Design Manager 314 provides design capabilities across technological as well as other multiple domains. It uses design rules for inter-domain connectivity, and correlates and coordinates designs amongst domains in an inter-domain path. The designs within a given domain on in-effect equipment and facilities is governed by the domain's specific design rules. More specifically, the functions of the End-to-End Design Manager 314 are as follows:

1. Perform end-to-end service design across one or more domains of the same or different technologies.
2. Manage inter-domain resources.
3. Service all requests to create, modify and disconnect intra-domain and inter-domain designs.
4. Submit "pending" designs to the Logical Tree Manager 310 to be stored in the connectivity database 290.
5. Request port assignment and cable link design information from the Physical Inventory Manager 260.
6. Request and coordinate detailed intra-domain service designs from the domain management systems 240.

The Implementation Manager 316 correlates and coordinates the implementation of the end-to-end design across domains. It manages any activities needed by domains to bring a circuit to service so that it can be billed to the customer. More specifically, the functions of the Implementation Manager 316 are as follows:

1. Service all implementation and "in-effect" requests, both intra-domain and inter-domain.
2. Access pending designs from the View Manager 312.
3. Correlate and coordinate implementation and "in-effect" activities amongst the domain management systems 240.
4. Request trail implementation and "in-effect" status from the domain management systems 240.
5. Notify the Physical Inventory Manager 260 to update cable link and other equipment to "in-effect" status.
6. Request the Logical Tree Manager 310 to update the trail status to "in-effect."

Figure 6:
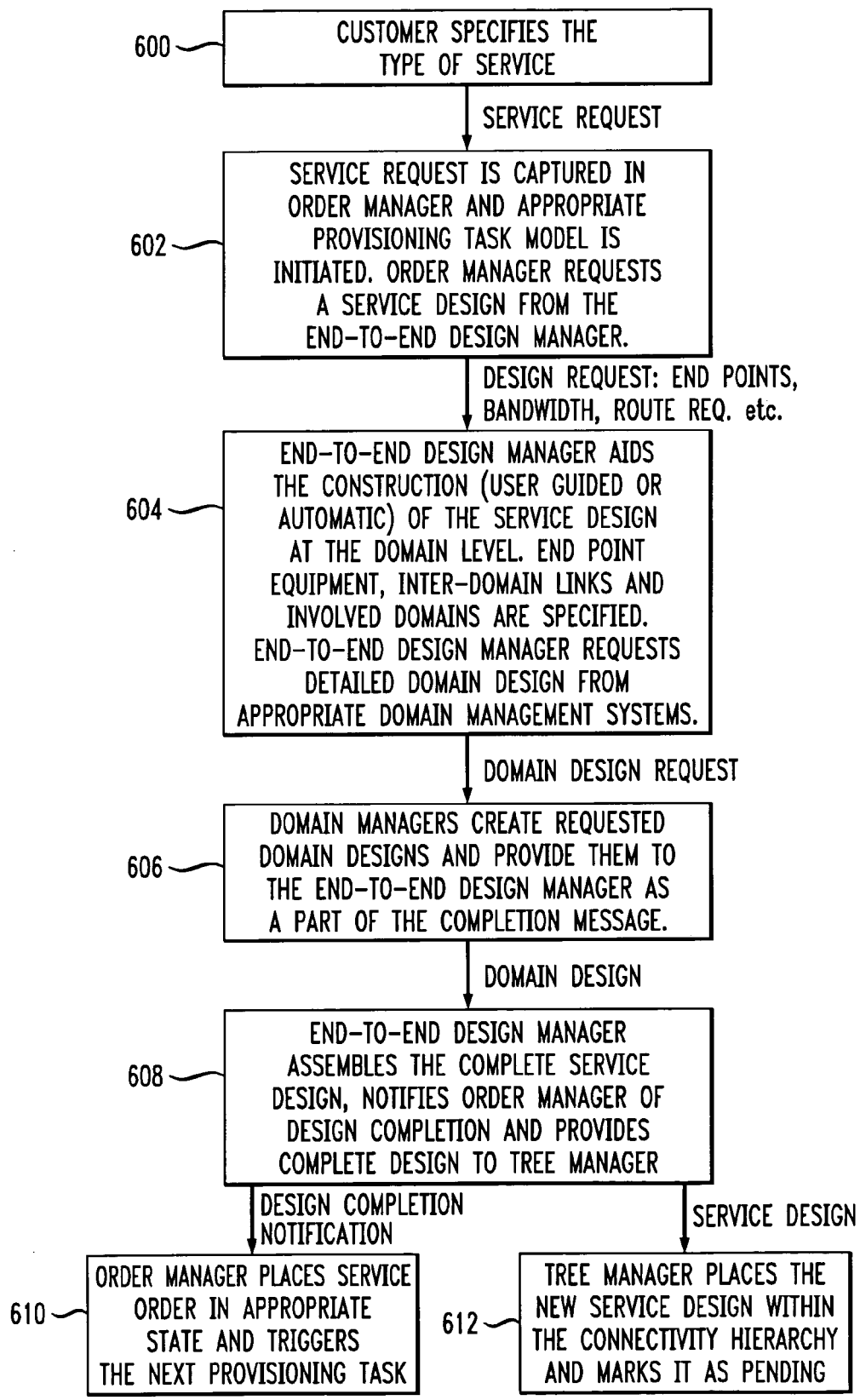
FIG. 6 is a flow diagram illustrating a design flow in accordance with the invention.

FIG. 6 shows a generic cross-domain service design flow in accordance with the invention, which involves interaction of the End-to-End Design Manager 314 with the Logical Tree Manager 310, Order Manager 280, and one or more of the domain management systems 240.

In step 600, the customer specifies the type of service that they would like to have. In step 602, the service request is captured in the Order Manager 280 and an appropriate provisioning task model is initiated. The Order Manager 280 then requests a service design from the End-to-End Design Manager 314. The request may specify end points, bandwidth, route requests, etc. In step 604, the End-to-End Design Manager 314 aides the construction of the service design at the domain level, in either a user-guided or automatic manner. For example, end point equipment, inter-domain links and involved domains may be specified. The End-to-End Design Manager 314 then requests detailed domain design information from the appropriate domain managers 240.

As indicated in step 606, the domain managers create requested domain designs and provide them to the End-to-End Design Manager 314 as part of a completion message. In step 608, the End-to-End Design Manager 314 assembles the complete service design, notifies the Order Manager 280 of the design completion, and provides the complete service design to the Logical Tree Manager 310. The Order Manager in step 610 places the service order in an appropriate state and triggers the next provisioning task. The Logical Tree Manager 310 in step 612 places the new service design within the connectivity hierarchy and marks it as pending.

Figure 7:
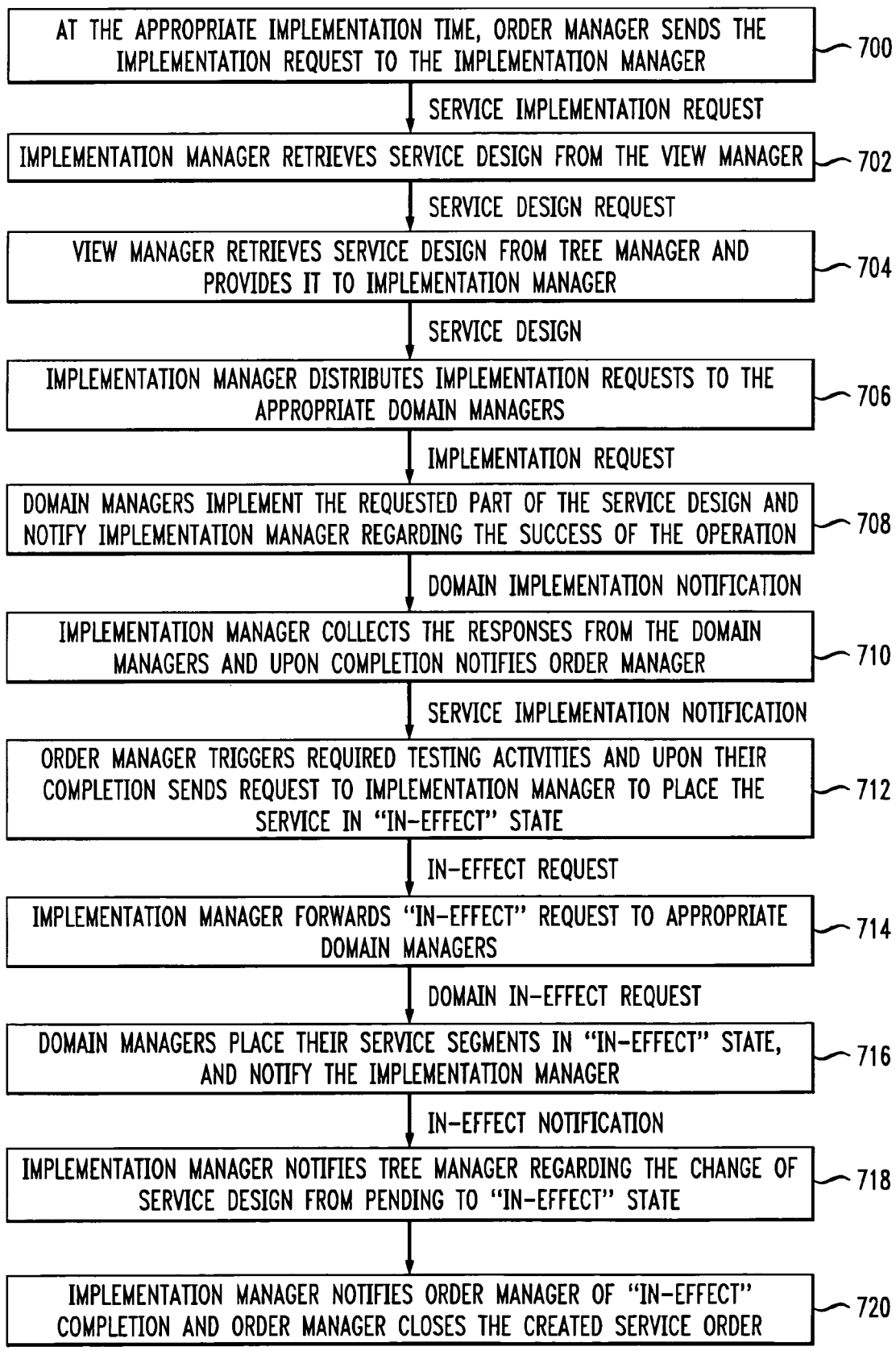
FIG. 7 is a flow diagram illustrating an implementation flow in accordance with the invention.

FIG. 7 shows a generic cross-domain service implementation flow which involves interaction of the Implementation Manager 316 with the Logical Tree Manager 310, Order Manager 280 and one or more of the domain managers 240.

In step 700, at the appropriate implementation time, the Order Manager 280 sends a service implementation request to the Implementation Manager 316. The Implementation Manager 316 in step 702 retrieves the corresponding service design from the View Manager 312. In Step 704, the View Manager 312 retrieves the service design from the Logical Tree Manager 310 and provides it to the Implementation Manager 316. The Implementation Manager 316 in step 706 then distributes implementation requests to the appropriate domain managers.

As indicated in step 708, the domain managers implement the requested part of the service design and notify the Implementation Manager 316 regarding the success of the operation. In step 710, the Implementation Manager 316 collects the responses from the domain managers and upon completion notifies the Order Manager 280 via a service implementation notification. The Order Manager 280 in step 712 then triggers required testing activities, and upon completion of the activities sends a request to the Implementation Manager 316 to place the service in "in-effect" status. In step 714, the Implementation Manager 316 forwards the "in-effect" request to the appropriate domain managers.

In step 716, the domain managers place their service segments in "in-effect" status, and notify the Implementation Manager 316 via an "in-effect" notification. The Implementation Manager in step 718 then notifies the Logical Tree Manager 310 regarding the change of service design from a pending to an "in-effect" status. In step 720, the Implementation Manager 316 notifies the Order Manager 280 of the "in-effect" completion, and the Order Manager 280 closes the created service order.

Figure 8:
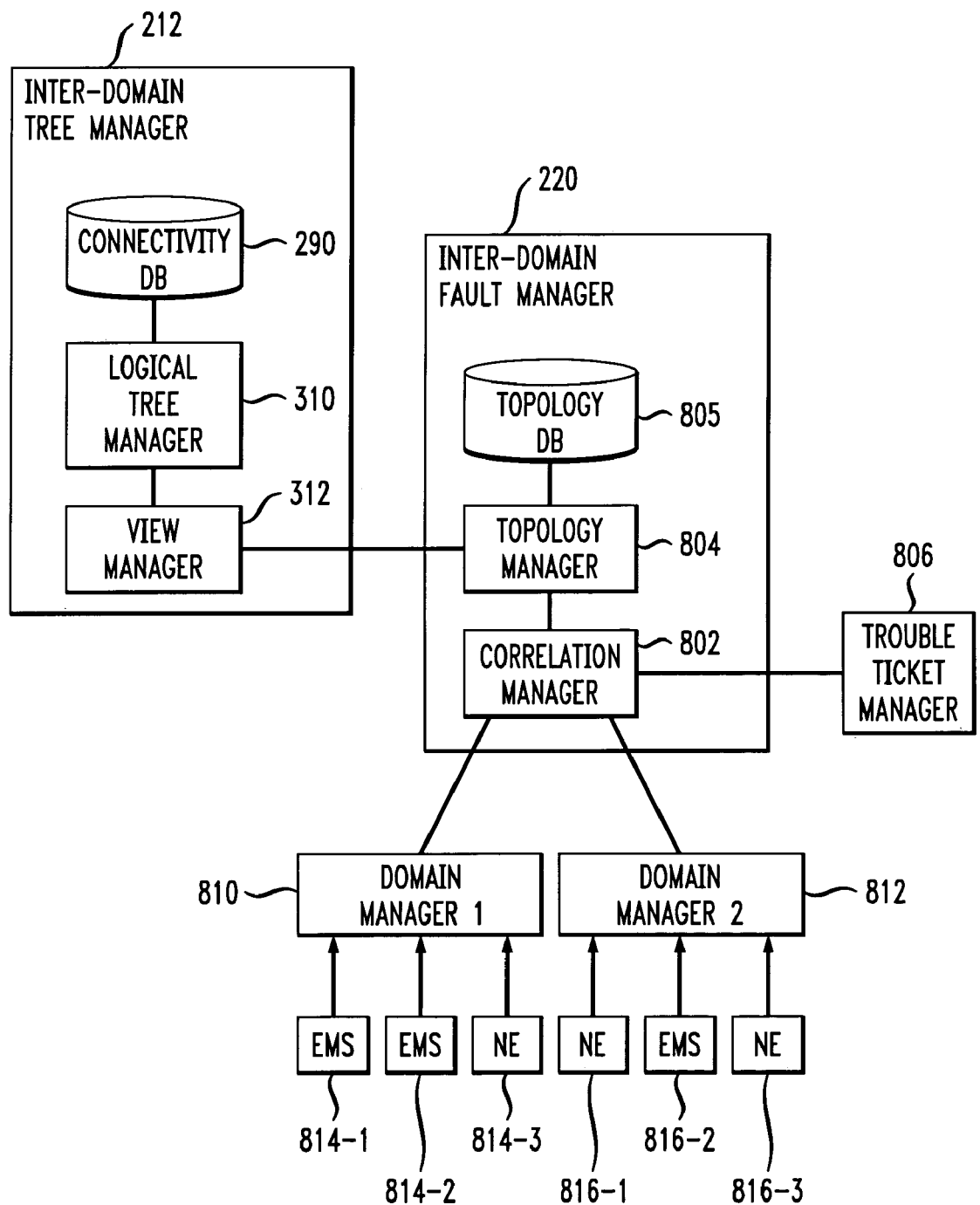
FIG. 8 shows a more detailed view of an inter-domain fault manager component of the FIG. 2 network management system in accordance with the invention.

FIG. 8 illustrates the operation of the Inter-Domain Fault Manager 220 in greater detail. The Inter-Domain Fault Manager 220 collects faults across different technological domains as well as other multiple domains and determines the root cause domain responsible for a particular fault. In the illustrative embodiment, the Inter-Domain Fault Manager 220 includes a Fault Correlation Manager 802, a Fault Topology Manager 804 and a Topology Database 805.

The Correlation Manager 802 applies topology information and user-defined rules to faults received from domain fault managers in order to determine the domain in which a root-cause fault occurred. After determining the root-cause domain of a particular fault, the Correlation Manager 802 creates a trouble ticket via a Trouble Ticket Manager 806 and notifies the appropriate domain fault managers with the root-cause fault information. The Trouble Ticket Manager 806 may be an element of or otherwise associated with the Trouble Manager 282 of FIG. 2. The functions of the Correlation Manager 802 are more specifically as follows:

1. Interface with domain fault management systems and receive alarms depicting domain fault manager views of the service affecting root-cause faults.
2. Interface with the Fault Topology Manager 804 to obtain network topology information.

3. Apply the user-defined correlation rules and network topology information to domain root-cause alarms to determine the actual root-cause problem domain.
4. Correlate the root-cause fault with an affected circuit identifier.
5. Interface with the Trouble Ticket Manager 806 to create a trouble ticket for the root-cause fault.
6. Notify the appropriate domain fault managers about the root-cause domain.
7. Optionally receive requests to create trouble tickets on behalf of domain fault managers for their non-service-affecting faults.
8. Notify the domain fault managers about the status of their trouble ticket requests along with a trouble ticket identifier.
9. Process service requests from the Customer Service Manager 286 for an out-of-service circuit list.

The Topology Manager 804 manages the fault topology database 805 in terms of populating the database entities with data from the Inter-Domain Tree Manager 212 and updating the alarm status of the database entities using information provided by the Fault Correlation Manager 802.

The Topology Manager 804 may obtain the initial load of the facilities and equipment data needed in the fault topology database 805 from the View Manager 312. The View Manager 312 will provide the various levels of the backbone network starting from greatest capacity pieces of the network, e.g., OC-48, through the interconnection facilities, e.g. ATM facilities, to the lowest level facilities, e.g., DS1s that terminate on a switch.

The Topology Manager 804 may be dynamically kept up to date with changes to the network and services via an interface to the View Manager 312. The Topology Manager 804 will thus subscribe to changes in the connectivity database 290 triggered by the implementation of engineering orders, customer orders, etc.

Figure 9:
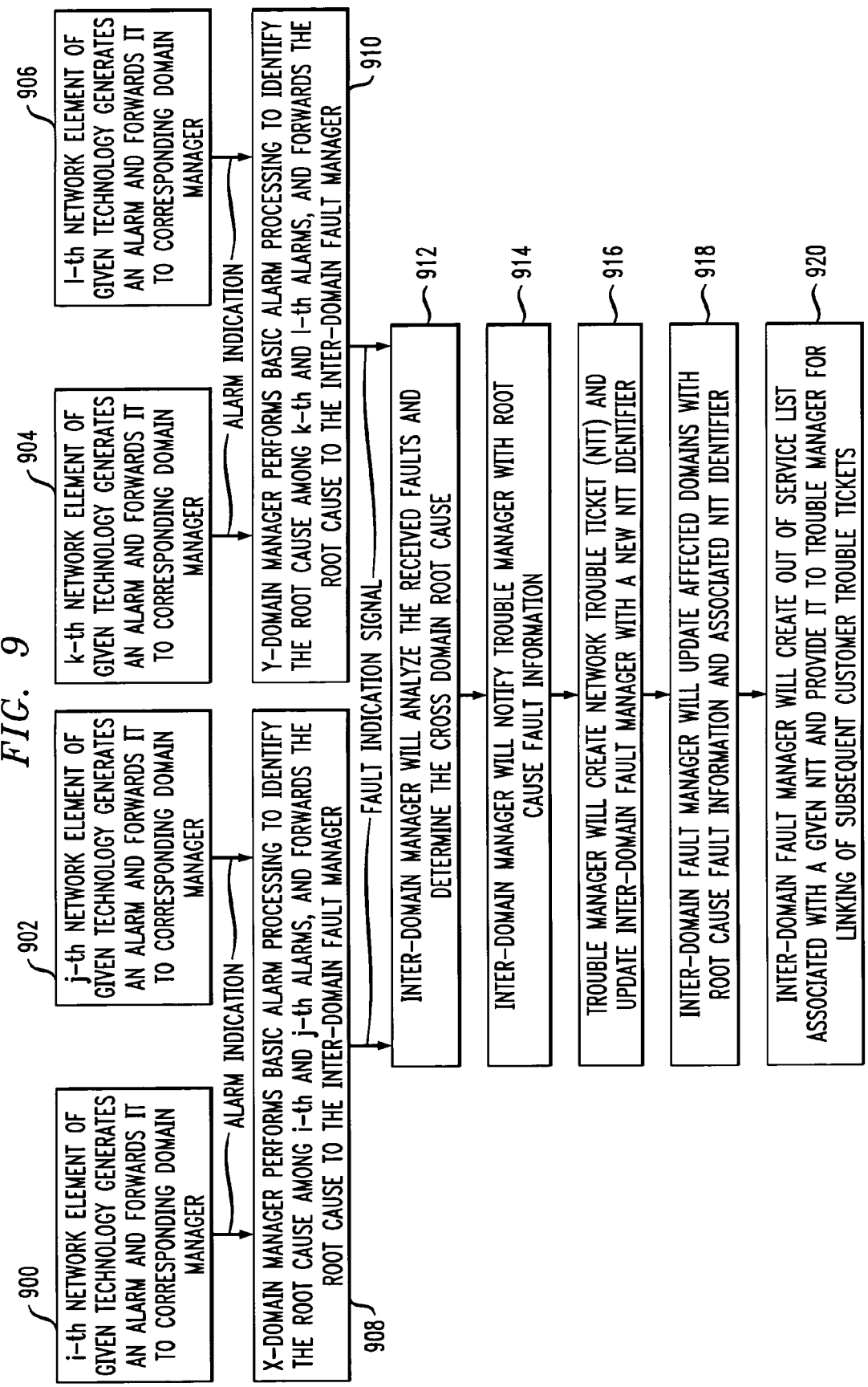
FIG. 9 is a flow diagram illustrating an inter-domain fault correction process in accordance with the invention.

FIG. 9 illustrates a generic process to correlate alarms across different domains in order to determine a root-cause domain. This procedure involves interaction of the Inter-Domain Fault Manager 220 with one or more of the domain managers 240.

In step 900, an i-th network element associated with a given technology domain generate an alarm and forwards it to its corresponding domain manager. Similarly, in steps 902, 904 and 906, respective j-th. k-th and l-th network elements generate alarms and forward them to their respective domain managers. It is assumed for this example that the i-th and j-th network elements are both associated with a domain X, while the k-th and l-th network elements are associated with a domain Y. In step 908, the X-domain manager performs basic alarm processing to identify the root cause among the i-th and j-th alarms, and forwards the root cause to the Inter-Domain Fault Manager 220. Similarly, in step 910, the Y-domain manager performs basic alarm processing to identify the root cause among k-th and l-th alarms, and forwards the root cause to the Inter-Domain Fault Manager 220.

As indicated in step 912, the Inter-Domain Fault Manager 220 analyzes the received faults and determines the cross-domain root cause. The Inter-Domain Fault Manager 220 in step 914 notifies the Trouble Manager 282 with the root-cause fault information. The Trouble Manager in step 916 then creates a Network Trouble Ticket (NTT) and updates the Inter-Domain Fault Manager 220 with the new NTT identifier. In step 918, the Inter-Domain Fault Manager 220 updates affected domains with the root-cause fault information and associated NTT identifier. The Inter-Domain Fault Manager in step 920 will then create an out-of-service list associated with a given NTT, and provide it to the Trouble Manager 282 for use in linking subsequent customer trouble tickets. The Trouble Manager 282 may utilize the trouble ticket information for functions such as proactively contacting high-priority affected customers.

Figure 10:
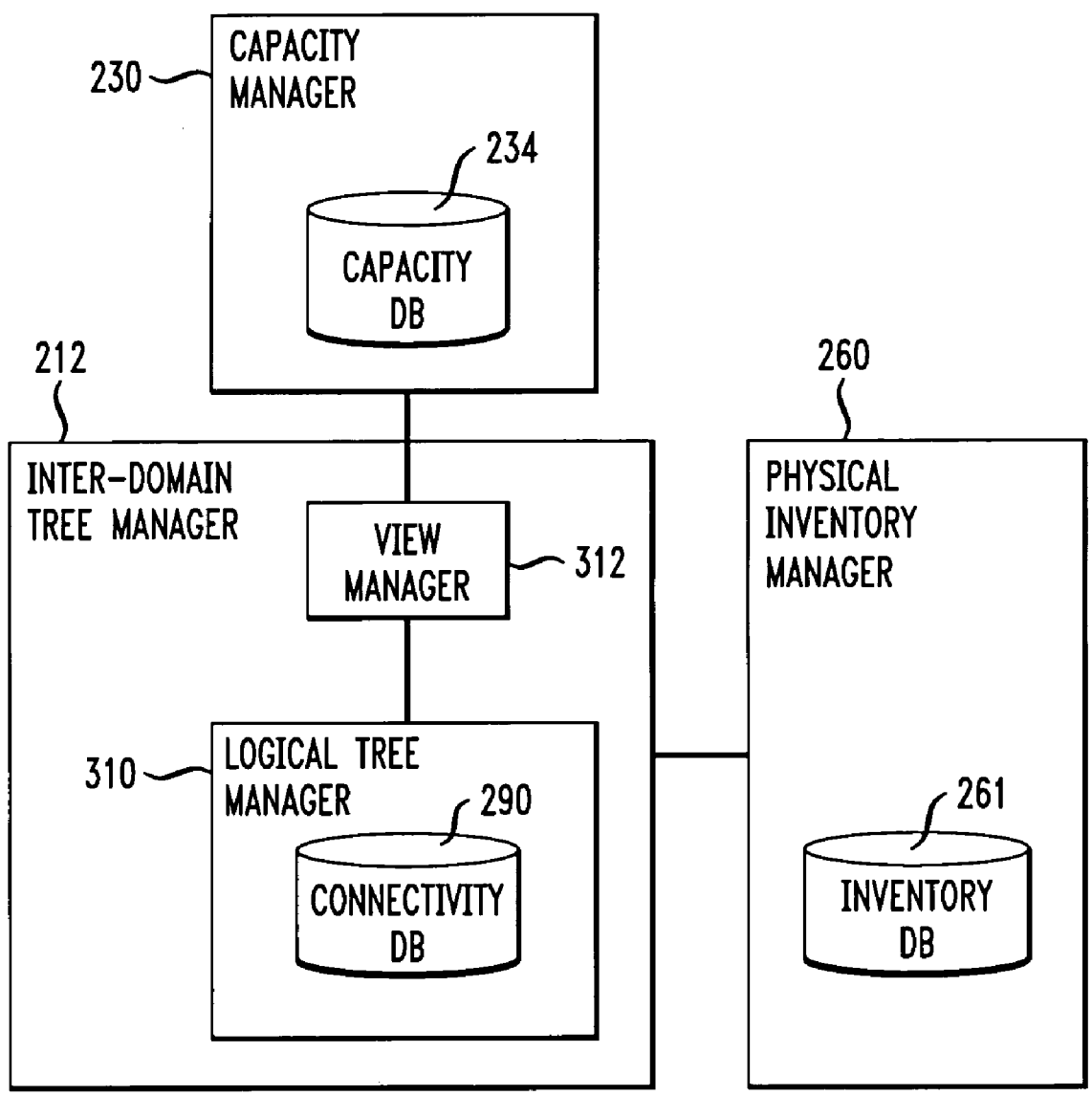
FIG. 10 illustrates a capacity manager component of the FIG. 2 network management system in accordance with the invention.

FIG. 10 illustrates the operation of the Inter-Domain Capacity Manager 230 in greater detail. As indicated in FIG. 2, the Inter-Domain Capacity Manager comprises a Capacity Manager 232 and a capacity database 234. The Inter-Domain Capacity Manager 230 enables service providers to perform proactive management of transport capacity across a multi-layer network comprising several technological domains, e.g., Optical, SONET, ATM, IP, etc. More specifically, the Inter-Domain Capacity Manager 230 enables providers to:

1. Set threshold crossing alerts on available route capacity between any two-service locations for all provided transport services or facilities.
2. Set threshold crossing alerts on the equipment capacity, which is maintained in the inventory system, i.e., number of available slots of a particular kind, etc.
3. Obtain pending vs. implemented views of the capacity, e.g., bandwidth, on any given date between two service locations.
4. Be notified of capacity threshold crossings.
5. Obtain periodic and on-demand reports of the monitored capacity.

The Inter-Domain Capacity Manager 230 subscribes to receive updates of the provisioned services or facilities via an interface to the View Manager 312. Every change in the state of the design stored in the connectivity database 290, as well as changes to equipment inventory, are reported. The Inter-Domain Capacity Manager 230 tracks spare, pending and in-effect capacity separately, compares the updated capacity against set thresholds, and alerts users of threshold crossings if they occur.

The above-described embodiments of the invention are intended to be illustrative only. For example, although described in conjunction with particular types of multi-layer networks, the invention is more generally applicable to any desired type of multi-layer network. In addition, the particular arrangement of network management system components in the illustrative embodiment can be varied in a straightforward manner to accommodate the specific needs of a particular implementation. The components described herein can be implemented in various conventional combinations or arrangements of hardware, software or firmware. For example, each of the manager components referred to herein may be implemented at least in part in the form of one or more software programs which are configured to run on one or more computers, workstations or other types of data processing devices. These and numerous other alternative embodiments may be devised by those skilled in the art without departing from the scope of the following claims.

What is claimed is:

1. A network management system comprising:
    an inter-domain configuration manager arranged between a set of one or more network service management applications and a plurality of network element domain managers, each of the domain managers being associated with a particular architectural or technological domain of a multi-layer network, the configuration manager implementing network service design and provisioning functions across a plurality of the domains of the network in conjunction with stored connectivity information characterizing the multi-layer network;

wherein the inter-domain configuration manager further comprises an inter-domain tree manager, the inter-domain tree manager comprising a logical tree manager operative to manage a transport service and facility hierarchy associated with the multi-layer network, and to maintain corresponding parent-child relationships in one or more tree structures that reference the domains containing real-time network details associated with the transport service and facility hierarchy.

2. The system of claim 1 wherein the inter-domain configuration manager is interfaced to at least one of the set of network service management applications and the plurality of network element domain managers through a published Common Object Request Broker Architecture (CORBA) Application Programming Interface (API).

3. The system of claim 1 wherein the set of one or more network service management applications comprise one or more of an order manager, a trouble manager, a billing manager, a customer service manager, and a service level reporter.

4. The system of claim 1 wherein the domains of the multi-layer network comprise one or more of a circuit-switched domain, an Internet Protocol (IP) domain, an Asynchronous Transfer Mode (ATM domain, a Frame Relay (FR) domain, a Synchronous Digital Hierarchy (SDH) domain, a Synchronous Optical Network (SONET) domain, and an optical domain.

5. The system of claim 1 wherein the inter-domain configuration manager provides single-point access to provisioning functions in a manner which is independent of the corresponding domains.

6. The system of claim 1 wherein the inter-domain configuration manager provides single-point access to end-to-end views of services and their underlying infrastructure, down to a physical layer of the multi-layer network, in a manner which is independent of the corresponding domains.

7. The system of claim 1 wherein the inter-domain configuration manager further comprises an inter-domain provisioning manager.

8. The system of claim 1 wherein the inter-domain tree manager maintains an end-to-end view of planned and provisioned transport services and facilities for the multi-layer network.

9. The system of claim 1 wherein the inter-domain tree manager further comprises a view manager, and a connectivity database for storing the connectivity information characterizing the multi-layer network.

10. The system of claim 1 wherein the logical tree manager manages an end-to-end transport service and facility hierarchy, and maintains corresponding parent-child relationships in one or more tree structures that reference the domains containing real-time network details associated with the end-to-end transport service and facility hierarchy.

11. The system of claim 9 wherein the view manager provides a plurality of different presentations of the network connectivity information, and provides a particular presentation associated with a tree structure stored by the logical tree manager upon receipt of a request for such a presentation.

12. The system of claim 7 wherein the inter-domain provisioning manager provides provisioning of services and facilities across the multiple domains.

13. The system of claim 7 wherein the inter-domain provisioning manager comprises an end-to-end design manager and an implementation manager.

14. The system of claim 13 wherein the end-to-end design manager provides network service design capabilities across the plurality of domains, utilizing a set of design rules for inter-domain connectivity, and coordinates designs among the domains in the particular inter-domain path.

15. The system of claim 13 wherein the implementation manager coordinates the implementation of an end-to-end network service design across the plurality of domains.

16. The system of claim 1 further comprising an inter-domain fault manager associated with the inter-domain configuration manager and arranged between at least a subset of the network service management applications and at least a subset of the plurality of network element domain managers, the inter-domain fault manager providing fault management functions across the plurality of domains of the network.

17. The system of claim 1 further comprising an inter-domain capacity manager associated with the inter-domain configuration manager and arranged between at least a subset of the network service management applications and at least a subset of the plurality of network element domain managers, the inter-domain capacity manager providing management of transport capacity across the multi-layer network.

18. A method of implementing a network management system, the method comprising the steps of:

providing an inter-domain configuration manager arranged between a set of one or more network service management applications and a plurality of network element domain managers, each of the domain managers being associated with a particular architectural or technological domain of a multi-layer network; and utilizing the inter-domain configuration manager to implement network service design and provisioning functions across a plurality of the domains of the network in conjunction with stored connectivity information characterizing the multi-layer network;

wherein the inter-domain configuration manager further comprises an inter-domain tree manager, the inter-domain tree manager comprising a logical tree manager operative to manage a transport service and facility hierarchy associated with the multi-layer network, and to maintain corresponding parent-child relationships in one or more tree structures that reference the domains containing real-time network details associated with the transport service and facility hierarchy.

19. A computer program product comprising one or more software programs for use in implementing a network management system, the one or more software programs when executed providing an inter-domain configuration manager arranged so as to interface with a set of one or more network service management applications and a plurality of network element domain managers, each of the domain managers being associated with a particular architectural or technological domain of a multi-layer network, the inter-domain configuration manager implementing network service design and provisioning functions across a plurality of the domains of the network in conjunction with stored connectivity information characterizing the multi-layer network;

wherein the inter-domain configuration manager further comprises an inter-domain tree manager, the inter-domain tree manager comprising a logical tree manager operative to manage a transport service and facility hierarchy associated with the multi-layer network, and to maintain corresponding parent-child relationships in one or more tree structures that reference the domains containing real-time network details associated with the transport service and facility hierarchy.

* * * * *

UNITED STATES PATENT AND TRADEMARK OFFICE
CERTIFICATE OF CORRECTION

PATENT NO. : 7,197,546 B1
APPLICATION NO. : 09/520133
DATED : March 27, 2007
INVENTOR(S) : Y.S. Bagga et al.

Page 1 of 1

It is certified that error appears in the above-identified patent and that said Letters Patent is hereby corrected as shown below:

On title page Item [56]
In the "References Cited" section under "Other Publications", please add the following:

--Mark H. Mortensen, "Operations Architecture for Data-Centric Converged Telecommunications Networks," Operations Support Systems 2002: Enabling the Next-Generation Network, Comprehensive Report, International Engineering Consortium, 2001, pp. 171-182--.

On title page Item [56]
In the "References Cited" section under "Other Publications", page 2, column 1, last line, please delete "Opeations" and insert --Operations--.

Signed and Sealed this

Fourteenth Day of August, 2007

JON W. DUDAS
*Director of the United States Patent and Trademark Office*